United States Patent [19]

Farnam

[11] 4,270,785
[45] * Jun. 2, 1981

[54] TAPERED VEHICLE BUMPER SHIM AND METHOD

[75] Inventor: Robert G. Farnam, Stevens Point, Wis.

[73] Assignee: F. D. Farnam Co., Necedah, Wis.

[*] Notice: The portion of the term of this patent subsequent to Jul. 10, 1996, has been disclaimed.

[21] Appl. No.: 925,057

[22] Filed: Jul. 17, 1978

[51] Int. Cl.³ .............................................. B60R 19/02
[52] U.S. Cl. ........................................ 293/1; 293/155; 308/244
[58] Field of Search ........................... 293/1, 99, 155; 308/244; 277/190

[56] References Cited

U.S. PATENT DOCUMENTS

| 1,748,412 | 2/1930 | Crawford | 308/244 |
| 2,772,596 | 12/1956 | Trussell | 308/244 |
| 4,160,561 | 7/1979 | Farnam | 293/1 |

Primary Examiner—John J. Love
Assistant Examiner—John A. Carroll
Attorney, Agent, or Firm—Mason, Kolehmainen, Rathburn & Wyss

[57] ABSTRACT

A shim is clamped between a component of a vehicle bumper assembly and a support member to provide a desired spacing for bumper alignment. The weight of the shim and the cost of material for its manufacture are minimized by forming the shim from sheet metal half the thickness or less of the desired spacing, and by folding the metal over inserts to provide multiple thicknesses in selected load bearing and other regions. A number of openings may be provided to further reduce the weight. Additional folded areas may be used for applications where loading is not restricted to areas adjacent the bolts, and ribs may be embossed in the shim to facilitate mounting of the shim and enhance its stiffness. The composite shim is finally "bumped" to give it a uniform taper.

9 Claims, 7 Drawing Figures

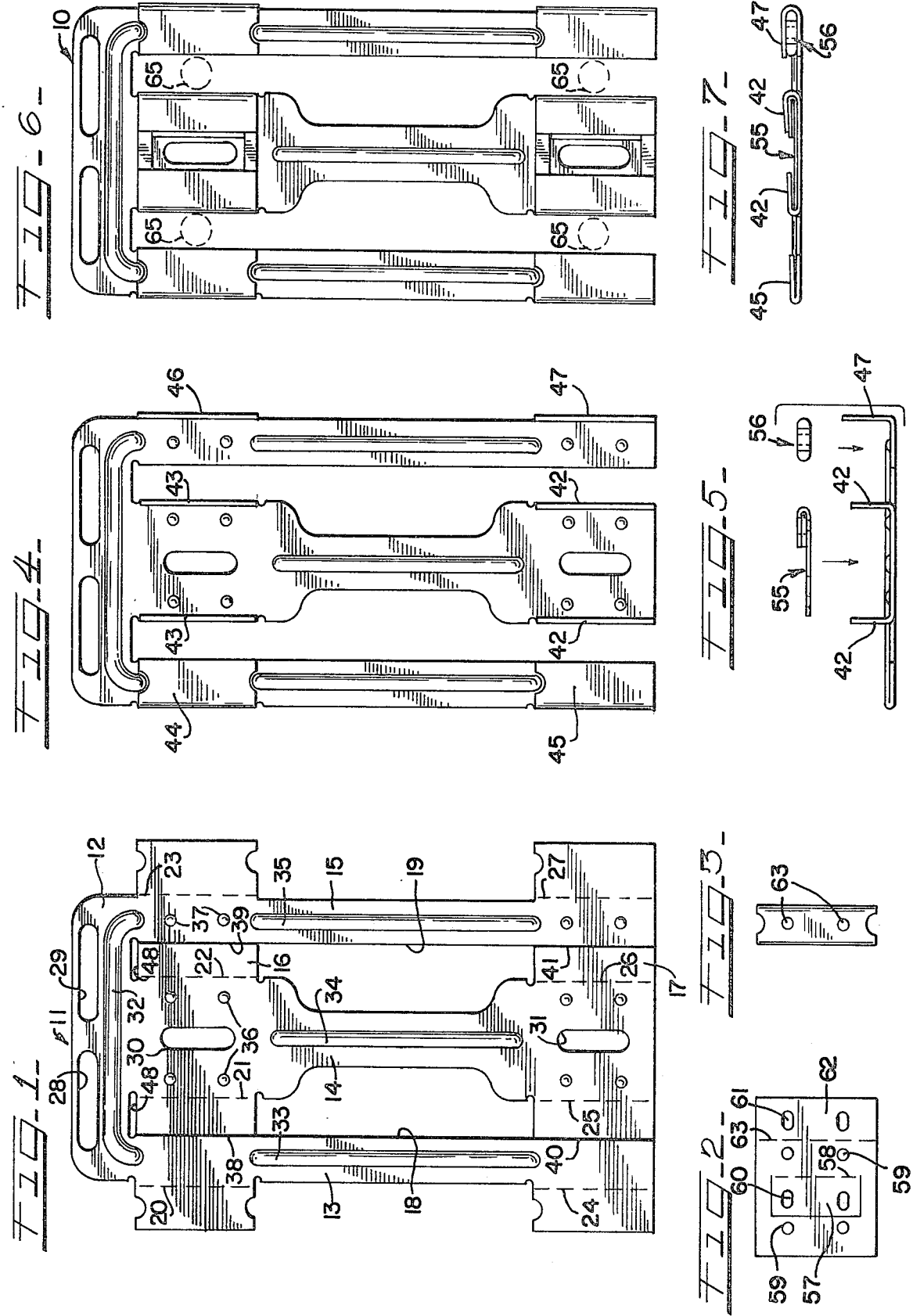

TAPERED VEHICLE BUMPER SHIM AND METHOD

The present invention relates to shims used in automotive vehicles and to a method for manufacturing such shims, and is related to an earlier application Ser. No. 829,451, filed Aug. 31, 1977, of which I am a co-inventor, and the disclosure of which is incorporated by reference.

During the assembly of an automobile or other vehicle, shims are customarily used to assure proper alignment of components of the vehicle, for example, the alignment of the bumpers with respect to the frame and body of the vehicle. Typically, a component of the bumper assembly, such as a bumper bracket, is attached to a support member which may be supported by, or comprise a part of, the vehicle frame. Due to tolerance variations in preceding assembly operations, when the bumpers are mounted, the support members are not consistently in a uniform position.

In order to assure that the bumpers are aligned properly, both for aesthetic and functional reasons, shims may be inserted in the neighborhood of the mounting bolts between the bumper assembly component and the support member. In the past, these shims have been formed of sheet material having thicknesses of, for example, one-sixteenth inch or one-eighth inch. In one typical arrangement, four mounting bolts in a rectangular array are used, and the shim takes the form of a fork-shaped element of uniform thickness having three tines defining two slots, each slot receiving two mounting bolts. Depending upon requirements for proper alignment, one or a number of shims selected from the two available thicknesses may be stacked to provide a desired spacing between the bumper assembly component and the support member. In the present invention, a tapered shim is provided for even better alignment.

The clamp load on the shim after assembly is large, and in some installation is highly localized in the regions immediately adjacent the mounting bolts. In order to provide sufficient strength, the shims are typically formed of steel, and in some cases, of aluminum.

Because of the important goal of fuel economy, it is desirable to make all components of a vehicle as light as possible, particularly if this can be accomplished economically. However, the use of lighter weight and less expensive materials for vehicle bumper shims can lead to difficulties in some installations because of a decrease in strength. Not only must the shims resist crushing during assembly, but also they should not exhibit excessive torque loss over a period of time due to vibrations, impact, temperature changes, and other conditions prevalent in the assembly.

The bumper mounting systems adopted for different vehicles or by different manufacturers can vary widely, and shims of diverse configurations are required. Moreover, shims of various sizes and shapes are utilized for many vehicle components other than bumpers, for example in the mounting of body and suspension components and the like.

In the present case, it is desirable to have the shim laterally tapered to provide the best means for obtaining the ultimate desired alignment between the bumper assembly and the body support. It has been found that an aluminum shim creates problems in normal usage because of the electro-chemical reaction between the aluminum and the adjacent steel. It is impractical to extrude steel within the dimensional tolerances required for a shim of this type and hence the present invention seeks to provide an extremely light weight fabricated steel shim. This is accomplished basically by providing a shim somewhat on the order of that described in my co-pending application heretofore identified, but modifying such structure in a number of ways, as by securing inserts or additional thicknesses of steel on two of the adjacent tines so as to provide what is in essence a tapered shim. Preferably also as a last step in the fabrication of the shim, the composite structure is "bumped" at a predetermined angle to provide a substantially flat surface on both the top and bottom faces of the shim.

Among the objects of the present invention are to provide improvements in the structure and method of manufacture of shims for vehicles; to provide an improved vehicle bumper shim; to provide a shim which makes possible a very large reduction in weight; to provide a shim which uses a minimum amount of material thereby effecting a reduction in weight and a reduction in material costs; to provide a shim which although inexpensive and light in weight is the equal of shims used heretofore in strength, performance characteristics and ease of handling and assembly; to provide improvements in the methods of manufacturing vehicle bumper shims; to provide a tapered shim which is non-corrosive when applied in a bumper assembly; and provide a novel method for making such a shim.

In accordance with an important feature of the invention, a substantial portion of the surface area of the shim is a single layer of the sheet metal, while selected load bearing regions of the shim are a multiple thickness of the sheet metal in order to provide the desired spacing yet minimizing weight and material costs. In a preferred embodiment, flaps integral with the sheet metal are folded over to provide double thickness load bearing regions.

The weight of the shim may be further reduced by providing openings in non-load bearing regions. In order to facilitate sliding insertion of the shim and to enhance stiffness where needed, embossed regions or additional multiple thickness areas may be provided.

The invention together with the above and other objects may be best understood from consideration of the following detailed description of the embodiments of the invention illustrated in the drawings, wherein:

FIG. 1 is a plan view of a shim blank after it comes from a first or early step of a progressive die;

FIG. 2 is a plan view of a blank which becomes an insert for the middle tine of the shim;

FIG. 3 is a plan view showing an insert used in building up the right hand tine shown in FIG. 1;

FIG. 4 is a plan view showing the blank following a secondary stage of a progressive die in which ears or flaps have been folded up to receive the inserts of FIGS. 2 and 3;

FIG. 5 shows the manner in which the inserts of FIGS. 2 and 3 are set in place within the blank of FIG. 4;

FIG. 6 shows the shim after the ears have been folded over to hold the inserts in place; and FIG. 7 shows the shim after it has been "bumped" to give it the desired lateral taper.

Referring now to the drawings, it will be understood that the tapered shim, generally designated 10, is preferably formed with progressive dies in substantially the same manner disclosed in the co-pending application previously identified.

In this manner a blank, generally designated 11, (FIG. 1) is formed from a metal strip preferably of C-1010 carbon-steel or C-1018 carbon-steel, and the blank thus formed includes a body portion 12 and three parallel bands or tines 13, 14 and 15, with the rear portion of the tines being joined together by a portion 16 of the blank, and a front portion of the tines being connected together by a portion 17 of the blank.

In forming the blank 11, slots 18 and 19 are punched into the blank to define the three tines and fold lines 20, 21, 22, and 23 are indented into the portion 16 of the blank, and likewise fold lines 24, 25, 26 and 27 are indented into the front portion 17 of the blank. At the same time slots 28, 29, 30 and 31 are cut from the blank to reduce weight, and ribs 32, 33, 34 and 35 are formed in the blank to provide stiffness. Slots 48 are also cut at this time.

During the same operation in forming the blank, locating means in the form of button protuberances 36 and 37 may be formed in the central band 14 and side band 15, and these serve as locators for the shim inserts as will later be described.

A second or successive stage in the development of the tapered shim 10 from the first blank 11 is to sever the blank 11 along the lines 38, 39, 40 and 41 to bend up the front and rear flaps 42 and 43 respectively. At the same time or in a successive die, the flaps 44 and 45 are folded along lines 20 and 24 to form a double thickness of metal in these areas, and the flaps 46 and 47 are bent at right angles to the body portion of the shim 12 as shown in FIG. 4 of the drawings.

Inserts, generally designated 55 and 56, are separately fabricated for use in building up thicknesses of tines 14 and 15 respectively. The insert 55 may be formed from strip steel of the same kind as that used in the main body of the shim, and it is formed with a slit tab 57 having a fold line 58, four circle openings 59 which constitute a part of the locating means, two elongated slots 60 and 61 in a fold-over tab 62 having a fold line 63.

It will readily be seen that when the tab 57 gets folded along the fold line 58, the slots 60 overlie the openings 59, and on top of this folded tab, the flap 62 is folded along the fold line 63 with the slots 61 again registering with the openings 59.

All in all, this insert structure produces an insert member 55 as shown in FIG. 5 which is readily located by the upstanding flaps or ears 42 and 43 of the central band or tine 14, with the openings 59 locking into the button protuberances 36 and 37 and with the insert having a triple thickness due to the double fold at the right hand side of the insert.

In a similar manner the tine 15 is built up to a greater thickness by the use of insert 56 which may be conveniently formed of a round edge flat wire preferably of C-1010 or C-1018 steel and cut or perforated as shown in FIG. 3 with openings 63.

In fabricating the shim 10, the flaps or ears 42 and 43 are bent over the inserts 55 to lock them in place, and in a similar manner the flaps or ears 46 and 47 are bent downwardly over the inserts 56 to lock them in place with the openings 63 again registering with the button protuberances 36 and 37 in the blank to properly locate the inserts.

As a final step the entire shim is "bumped" under a very heavy load in a stamping press having an inclined face to develop the desired over-all taper which in this instance may be on the order of two degrees, which means that both the upper and lower faces of the shim lie in planes which are at this angle to each other.

It will be noted that in the structure which has been described, the shim has not only a tapered form, but also reinforced load bearing areas (defined by the flaps 42, 43, 44, 45, 46 and 47) at the front and rear sections of the shim and this is very important because it is in these areas that the mounting bolts shown in dotted lines at 65 in FIG. 6 are located and it is important in these areas to provide a hard, non-deformable, crush resistant bearing area to take the torque load of the retaining bolts. Non-deformability and crush resistance are also important for the torque retention of these bolts.

The shim just described is characterized by being made of steel and avoiding the problems inherent with the use of aluminum shims. It is light weight, has reinforcing ribs in areas where lateral rigidity is needed, and the shim is so fabricated that concentration of steel is limited to the specific areas of the shim where the metal is really needed. As a result, the fabricated shim compares very favorably with aluminum shims of similar thickness and can be produced economically.

By way of illustration, the main body of the shim may be made from 0.048 carbon-steel (C-1010 or C-1018); the ribs 33, 34 and 35 may have a 7/64" R and a 0.040 inch rise, the protuberances 36 and 37 may have a 0.030 rise to serve as locators; the insert 55 may be formed of 23 gauge C-1010 or C-1018 steel and the insert 56 may be formed of round edge flat wire of the same material having a width of 0.500 inches and a thickness of 0.109 inches.

It is preferable that the fabricated tapered shim as above described be rust-proofed in some manner when the shim is made of steel, and this may be done by plating in the conventional manner or by applying a corrosion resistant organic phosphate coating.

Also, it should be understood that the term "tines" is used in its broadest sense to identify the three parallel bands projecting from the body portion 12 and does not preclude the possibility that the bands may be joined together at their remote ends as, for example, by leaving a portion of the tabs 42 integrally joined to the bands 13 and 15. In such case, the shim will be mounted over the bolts 65 rather than being slipped into place.

While the invention has been described with reference to details of the illustrated embodiments and with reference to details of the preferred method, such details are not intended to limit the invention as defined in the following claims.

What is claimed and desired to be secured by Letters Patent of the United States is:

1. A tapered shim for automobile bumpers and the like comprising:
    a body portion having three parallel tines, two outer and one central tine, projecting therefrom and separated by elongated slots for the reception of mounting bolts;
    front and rear load bearing areas on each of said tines;
    each of said load bearing areas including a bent over flap integral with said body portion; and
    metal inserts secured to two adjacent tines in the load bearing areas thereof by the adjacent flaps, the insert for the outer tine being of greater thickness than that of the center tine.

2. A tapered shim as set forth in claim 1 in which the top faces of said load bearing areas all lie in one plane, and the bottom faces thereof all lie in another plane at an angle thereto.

3. A tapered shim as set forth in claim 2 in which the angle between planes is about two degrees.

4. A tapered shim as set forth in claim 1 in which one of said inserts comprises sheet metal having an integral tab folded back upon itself to give the insert additional thickness in that area.

5. A tapered shim as set forth in claim 4 in which said one insert has a second tab folded over the first tab to increase the thickness of the insert in that area.

6. A tapered shim as set forth in claim 1 in which the central tine and an outer tine are provided with locator means cooperating with locator means on the metal inserts for properly positioning the inserts on the tines.

7. A method of fabricating a tapered shim for automobile bumpers and the like which consists of stamping a blank from a metal strip to provide a body portion having three parallel tines projecting therefrom with front and rear opposed flaps projecting upwardly from the center tine, and front and rear flaps projecting upwardly from an adjacent outer tine;

placing metal inserts between the opposed flaps at the front and rear areas of the central tine;

placing metal inserts of greater thickness than said first insert on said adjacent tine in juxtaposition to the upstanding flaps thereon; and folding over said upstanding flaps on the central and adjacent outer tines to lock the inserts in place and to provide reinforced load-bearing areas at the front and rear portions of said tines.

8. The method as set forth in claim 7 in which the metal insert on the central tine member and the adjacent tine member are positioned by locator means on said members prior to locking them on said members by said folded flaps.

9. The method as set forth in claim 7 in which the blank with its secured inserts is bumped by an inclined face of a press to have all of the load bearing areas on one side of the shim in one plane and all the load bearing areas on the other side of the shim in another plane at an angle thereto.

* * * * *